Patented Mar. 1, 1932

1,847,795

UNITED STATES PATENT OFFICE

THEODOR THORSSELL AND AUGUST KRISTENSSON, OF CASSEL, GERMANY

PROCESS FOR REMOVING HYDROGEN SULPHIDE FROM GASES

No Drawing. Application filed September 7, 1928, Serial No. 304,612, and in Germany September 16, 1927.

It has frequently been proposed to remove hydrogen sulphide from mixtures of gases with iron compounds.

The best known are the suggestions to use ferric hydrate in suspension in an alkaline solution and ferric chloride in solution.

Ferric hydrate has the advantage that the absorption is very complete and that the resulting product can be easily oxidized again. On the contrary, it has the disadvantage that the sulphur separated by the above oxidation can only be obtained mixed with ferric hydrate.

Ferric chloride has the advantage that the sulphur is directly precipitated in a pure form during the absorption and can be obtained by simple filtration. On the contrary, it has the disadvantage that the power of absorption of the hydrogen sulphide by the ferric chloride solution is limited so that a state of equilibrium soon manifests itself. The occurrence of this state of equilibrium depends upon the concentration of the ferric chloride solution used. The stronger the solution is the smaller proportion of the salt takes part in the reaction, as shown by the following table:

| Grms. per 100 gr. solution | | | |
|---|---|---|---|
| Before reduction | After reduction | | % recovery |
| $FeCl_3$ | $FeCl_3$ | $HCl$ | |
| 30 | 22.2 | 1.75 | 26 |
| 15 | 9.45 | 1.25 | 37 |
| 5 | 1.65 | 0.75 | 67 |

In order to obtain in some degree a good yield, it is thus necessary to work with very dilute solutions, which is a disadvantage for the practical procedure. Furthermore, the use of ferric chloride has the disadvantage that the oxidation of the ferrous chloride formed takes place fairly slowly.

The present invention which is preferably carried out at a temperature of 60 to 80° C. may be conducted at atmospheric temperature and it consists in the use of a basic ferric salt in a ferric salt solution or suspension as an absorbing agent for hydrogen sulphide and treating the solution of the corresponding ferrous salt with an oxidizing agent and washing the gases in said iron salt solution.

Such a suspension is obtained by oxidation of the corresponding ferrous salt in neutral or weak acid solution. By this means, for instance, a part of the iron in ferrous chloride separates out as a basic chloride during the oxidation.

Nitric acid is used in the present application as oxidizing agent in order to produce an absorbing liquid, which consists of a basic ferric salt suspended in a ferric salt solution. Concentrated solutions are preferably used.

If a solution of ferrous chloride is oxidized with nitric acid, then a pure, bright yellow body suspended finely through the solution is obtained. The liquid consists of ferric chloride solution. The proportion between the contents of iron and chlorine in the suspended solid body corresponds to the formula: $FeCl_3.6Fe(OH)_3$, thus to a very basic ferric chloride. This is so finely divided that it is almost in the colloidal state, that is, it settles out from the liquid extremely slowly. The liquid with the therein suspended basic chloride thus possesses properties which make it particularly suitable for the practical use as a feeding fluid for absorption towers.

The reaction can be expressed by the following equation:

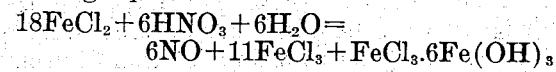

The NO formed in this reaction is again converted into nitric acid in the usual way:

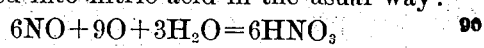

The liquid with the therein suspended solid basic chloride absorbs hydrogen sulphide from the gas mixture according to the following equation:

$$11FeCl_3 + FeCl_3.6Fe(OH)_3 + 9H_2S = 18FeCl_2 + 9S + 18H_2O$$

The reaction proceeds quantitatively and the product is a clear solution with pure sulphur suspended in it. This has not the disadvantage which causes difficulties in working when absorbing with ferric chloride, namely that the reaction is soon limited and is dependent upon the concentration of the solution. Further, it has not the disadvantage that the sulphur separated is mixed with much $Fe(OH)_3$, as is the case when washing the gas mixture with a suspension of $Fe(OH)_3$ in alkaline solution.

After filtering off or centrifuging off the pure sulphur, the clear ferrous chloride solution is again oxidized with the recovered nitric acid.

*Example*

One cubic meter of a solution, which contains 100 kg. $FeCl_2$, is oxidized with 16.6 kg. $HNO_3$ at about 70°. From this escape 7.9 kg. NO, which oxidized with air and absorbed in water again yield 16.6 kg. $HNO_3$. The oxidized solution contains 78.2 kg. dissolved $FeCl_3$ and 35.2 kg. suspended $$FeCl_3.6Fe(OH)_2.$$

The solution is used for gas washing, when 13.4 kg. $H_2S$ become absorbed and 12.6 kg. S separated. After filtering the sulphur, the solution constitutes the aforesaid starting solution with 100 kg. $FeCl_2$.

What we claim is:—

1. A process for removing hydrogen sulphide from gases and simultaneously obtaining the sulphur, comprising preparing an iron salt solution with a basic ferric salt suspended therein by treating a ferrous chloride solution with an oxidizing agent and washing the gases with the said iron salt solution.

2. A process for removing hydrogen sulphide from gases and simultaneously obtaining the sulphur, comprising preparing an iron salt solution with a basic ferric salt suspended therein by treating a ferrous chloride solution with nitric acid and washing the gases with the said iron salt solution.

3. A process for removing hydrogen sulphide from gases and simultaneously obtaining the sulphur, comprising preparing an iron salt solution with a basic ferric salt suspended therein by treating a ferrous chloride solution with an oxidizing agent, washing the gases with the said iron salt solution and then treating the resulting solution of iron salt and hydrogen sulphide with an oxidizing agent to make it suitable for use again.

4. A process for removing hydrogen sulphide from gases and simultaneously obtaining the sulphur, comprising preparing an iron salt solution with a basic ferric salt suspended therein by treating a ferrous chloride solution with nitric acid, washing the gases with the said iron salt solution and then treating the resulting solution of iron salt and hydrogen sulphide with an oxidizing agent to make it suitable for use again.

In testimony whereof we have signed our names to this specification.

THEODOR THORSSELL.
AUGUST KRISTENSSON.